United States Patent [19]

Jaster

[11] Patent Number: 4,571,532
[45] Date of Patent: Feb. 18, 1986

[54] PHOTOVOLTAIC POWER REGULATION SYSTEM

[75] Inventor: Dale R. Jaster, Northlake, Ill.

[73] Assignee: GTE Automatic Electric Incorporated, Northlake, Ill.

[21] Appl. No.: 548,540

[22] Filed: Nov. 3, 1983

[51] Int. Cl.⁴ .............................................. H02J 7/10
[52] U.S. Cl. ...................................... 320/2; 136/293; 320/32; 323/906
[58] Field of Search ................ 136/291, 293; 320/2, 320/61, 9, 34, 32, 22-24, 39, 40; 323/906

[56] References Cited

U.S. PATENT DOCUMENTS

| | | | |
|---|---|---|---|
| 389,125 | 9/1888 | Weston | 322/2 X |
| 3,317,809 | 5/1967 | Bowers et al. | 320/30 |
| 3,419,779 | 12/1968 | Zehner | 320/23 X |
| 4,136,309 | 1/1979 | Galberth et al. | 323/906 X |
| 4,143,282 | 3/1979 | Berard, Jr. et al. | 323/906 X |
| 4,383,211 | 5/1983 | Staler | 320/39 X |

OTHER PUBLICATIONS

Corbett, "Development of High Voltage High Power Satellite Systems", SAE, 1978.

Primary Examiner—R. J. Hickey
Attorney, Agent, or Firm—Charles A. Doktycz

[57] ABSTRACT

An apparatus for controlling the charge rate and voltage of storage batteries of a solar power generating system using a single voltage regulator module to monitor and control the state of charge of any number of cells of a battery and a number of solar modules.

7 Claims, 5 Drawing Figures

PHOTOVOLTAIC POWER REGULATION SYSTEM

CROSS-REFERENCE TO RELATED APPLICATION

The present application is related to copending U.S. patent application Ser. No. 414,180, now abandoned, having the same inventor and assigned to the same assignee.

FIELD OF THE INVENTION

This invention is directed to solar energy generating systems and associated storage batteries and more particularly to an arrangement which provides maximum control on charging rate with minimum power losses or consumption.

BACKGROUND OF THE INVENTION

Commercially available solar regulators generally operate using one of two basic methods or a combination of these methods. One method is the employment of a series regulator which uses a varying resistance in series with the charge current flow. The resistance is varied as a function of battery voltage such that the charge current is restricted or tapered off gradually to a trickle charge rate when the batteries are fully charged.

The second method is the shunt regulator principle where a variable resistance is paralleled to the batteries such that as the voltage of the batteries increases, the shunting resistance is caused to decrease, shunting current away from the battery. The resultant is again a tapering charge applied to the batteries.

The series-parallel regulator applies both principles simultaneously, resulting in the same resultant action.

The prime disadvantage to all of these methods is that a nominal impedance exists in all of the regulators connected between the solar modules and the storage battery. This results in an unacceptable energy loss even when regulation is neither occurring nor required.

Another disadvantage is that the amount of current regulated or controlled is limited by the heat dissipating ability of the current carrying components of the conventional regulators, typically requiring the installation of additional regulators as the system is expanded.

SUMMARY OF THE INVENTION

The present invention, functioning in a regulating mode, utilizes the chemical action of the storage battery and the operate and release time of a relay to form an oscillator, whose frequency rate is a function of the regulator and the storage battery.

When the battery voltage is below a presetable point, no regulation is effected and the regulator is in a quiescent "charge" state. At the preselected voltage point, the circuit begins to oscillate at a rate which has an infinite duty cycle proportional to the ability of the storage battery to accommodate a charge at an interrupted averaging rate. Eventually the regulator enters its second quiescent "no charge" state and opens the connection between the solar modules and the storage battery; the preset voltage being maintained by a nominal trickle charge rate, assuming no additional load or demand is placed on the storage battery.

The regulator is designed to function with the photovoltaic auto-isolator (patent pending) to provide regulation and control of a substantially large number of solar modules and storage batteries. This is accomplished by interconnecting the regulator with a system comprised of one master and a finite number of remote units connected with the solar modules. The master and remote units provide the same current interrupting function as does the regulator, but providing the regulation in small increments as the power is being generated.

BRIEF DESCRIPTION OF THE DRAWINGS

For a further understanding of the invention, reference should be had to the following detailed description taken in connection with the accompanying drawings in which:

FIG. 3 is the storage battery's terminal voltage in response to the regulating action.

FIG. 4 illustrates the infinitely variable duty cycle of the charging action as the storage battery approaches full charge.

FIG. 5 depicts the average charging current applied to the storage battery, tapering down to a trickle charge.

DESCRIPTION OF THE PREFERRED EMBODIMENT

Figure 1:
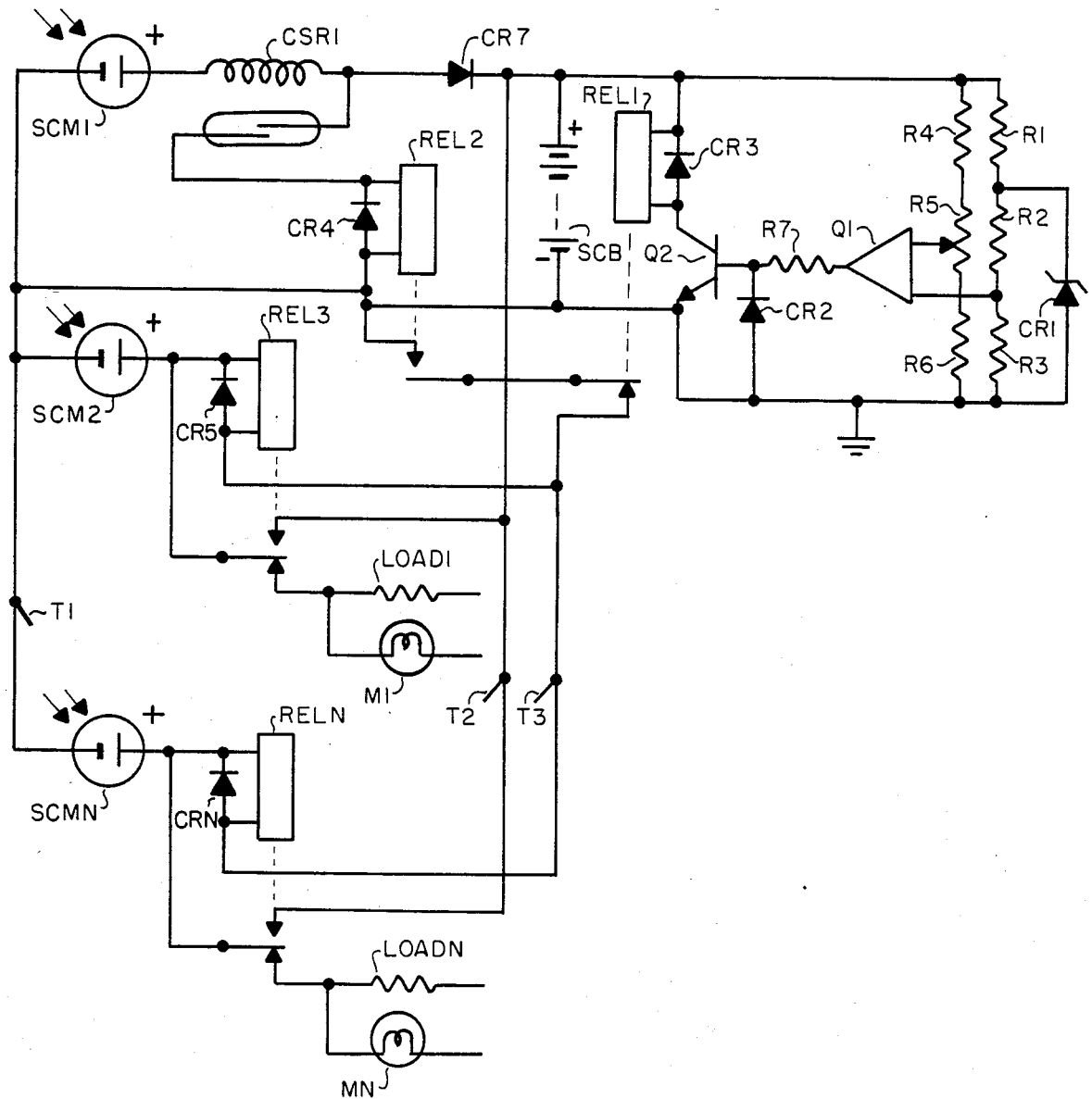
FIG. 1 is a schematic drawing of the photovoltaic power regulation system of this invention showing the interconnection technique when photovoltaic auto-isolator master is used in conjunction with remote units and the regulator to accomplish higher current regulation.

The circuit of FIG. 1 shows the interconnection of the modules of the photovoltaic power regulation system of the present invention. The battery of energy storage cells about which this entire system is concerned is shown labeled SCB. A voltage regulator unit is shown to the right of the vertical dashed line connected across the storage battery terminal.

To the left of the storage battery SCB is shown a control module and a first and Nth remote photovoltaic unit.

The control module includes a first group of solar cells labeled SCM1, connected in series with the winding of a current sensing relay CSR1 and a diode CR7 all connected across the terminals of the storage battery. Connected intermediately of the diode CR7 and the relay winding is a potential circuit path through the make contacts of relay CSR1 and the winding of another relay REL2 to the negative terminal of the battery. A diode CR4 is connected across the winding of the relay as an inductive kick suppressor.

The voltage regulator unit utilizes a pair of voltage dividers tapped to provide the input to a differential amplifier Q1. The first voltage divider consists of the series resistors R1, R2 and R3 connected from the positive to the negative battery terminals with the voltage tapped between resistors R2 and R3. Across the two resistors R2 and R3 is a zener diode CR1 for maintaining the voltage across these resistors constant. The second voltage divider consists of the series resistors R4, R5 and R6 across the battery, also from the positive to the negative terminals of the battery. Resistor R5 is actually a potentiometer to provide for a precise adjustment of the operating voltage level to the amplifier Q1. Also across from the positive battery terminals is a relay REL1 whose winding is connected in series with the collector emitter path of an amplifying transistor Q2 to the negative battery potential. The transistor Q2 is controlled to its conductive state upon Q1 sensing a voltage indication of a fully charged condition of the storage battery SCB. The operate path is via resistor R7 and upon operation of relay REL1 its associated contacts are opened to remove the remote units from the charge circuit. Again diodes CR3 and CR2 are for the purpose of electrical noise suppression.

The remote units each include a connect relay such as REL3 connected in series with the photovoltaic array SCM2 from the negative battery terminal through the break contacts of relay REL1 of the voltage regulator and the make contacts of relay REL2 of the control unit to the positive battery terminal. During the released state of the relays, the relay REL3 upon operation serves to connect the solar cells to charge the battery. During the time that the battery does not require charging and the relay REL3 is in an unoperated state, any output of the solar cells may be used for non essential load purposes shown as load 1, a monitor lamp M1 may also be connected to the back contacts to indicate the relays unoperated state.

Additional remote units as required may be connected to the system at terminals T1, T2 and T3 up to the Nth unit shown. The basic limitation being only the current ratings of the contacts used in the relays.

Figure 2:
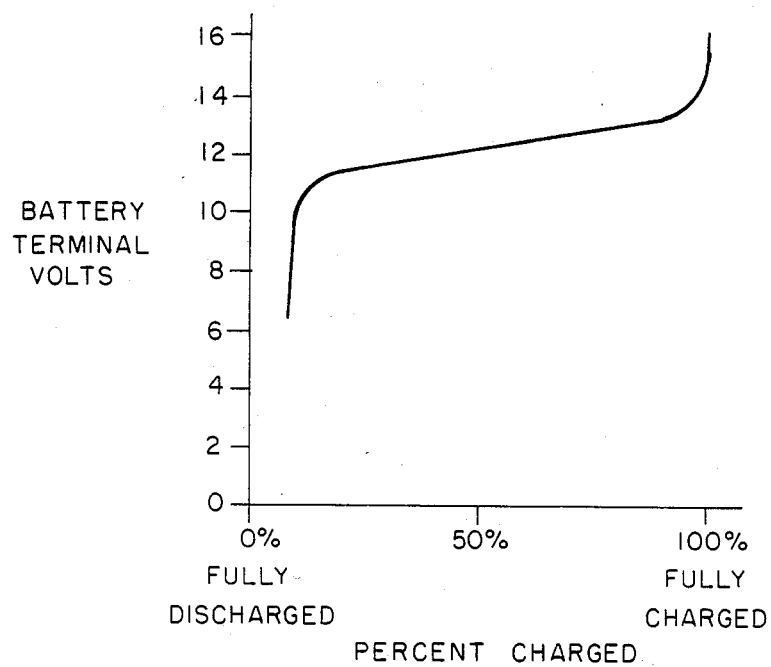
Figure 3:
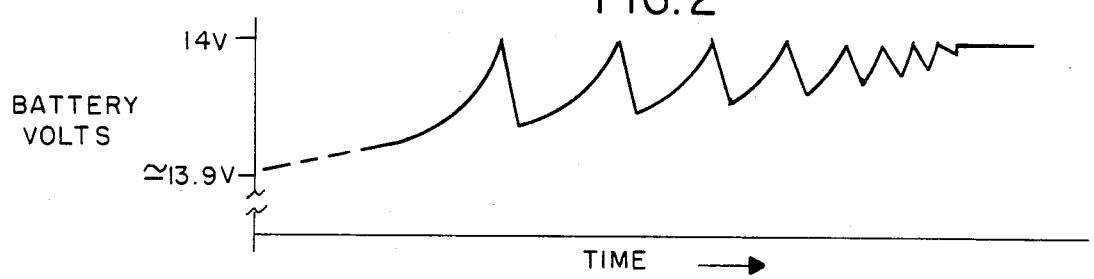
FIGS. 3, 4, and 5 are a set of waveforms, all relative to each other in regard to time.

Referring to FIG. 2, there is shown a typical 12 volt storage battery charge-discharge curve relative to the percentage of being fully charged. The voltage regulator of FIG. 1, attached to the storage battery terminals, monitors the battery voltage. At a preset voltage, on or below the knee of the curve near full charge, the circuit will begin to oscillate, interrupting the charge current. The voltage regulator itself is a voltage comparator which drives the relay REL1. When the battery voltage impressed across resistors R4, R5, and R6 and tapped at R5 equals or exceeds the reference voltage at the junction of resistors R2 and R3, relay REL1 operates and interrupts the charge current. The battery voltage slowly drops as shown on FIG. 3 reflecting the depletion of charged carriers in the electrolyte of the storage battery. When the battery voltage drops sufficiently, the voltage comparator again causes relay REL1 to release and the charge current is restored.

Figure 4:
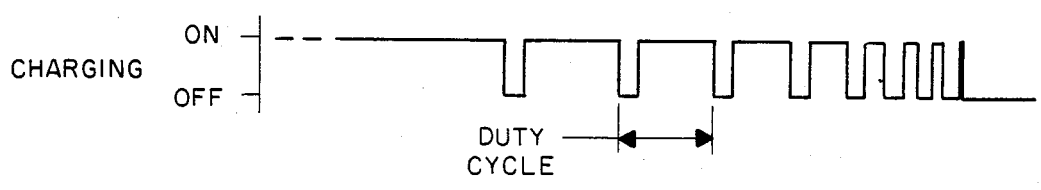
Figure 5:
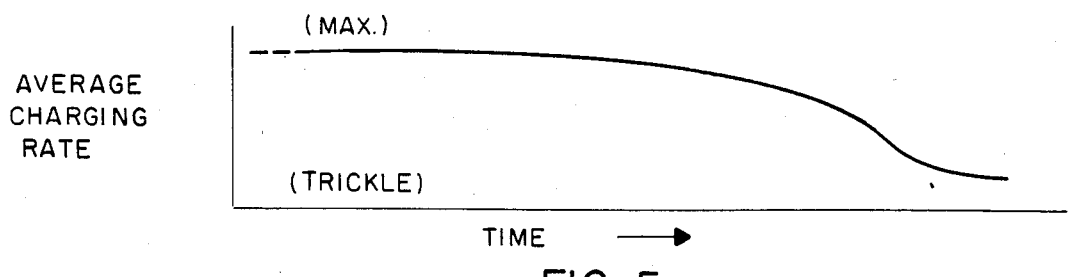

This oscillatory condition as shown in FIG. 4 continues, but with each successive interruption the battery voltage does not drop to the exact value of voltage occurring prior to the previous interruption. The time to the next interruption will be slightly less than the last and the result is an infinite range of duty cycles such that the average charge current starts to drop. At the moment the battery voltage can be maintained by a trickle charge via diode CR7 and the battery voltage no longer drops below the preselected point shown on FIG. 5, the relay REL1 is held operated and the charge current is maintained at its lowest level.

What is claimed is:

1. A multi-solar module direct current battery charging arrangement comprising:
    a first plurality of solar cells;
    a reverse current blocking diode;
    a first relay having an energizing winding; and a set of make contacts;
    said diode, said energizing winding and said solar module connected across said battery;
    a second relay having a second set of make contacts;
        said first relay make contacts operated upon a predetermined current flow through said first relay winding to close said first relay make contacts to operate said second relay;
    a voltage regulator having a set of make contacts;
        said regulator contacts operated upon said battery reaching a predetermined state of charge as indicated by the voltage level;
    a second plurality of solar cells and a third relay having a set of make contacts;
        said second relay make contacts, said voltage regulator make contacts, said third relay and said second plurality of solar cells connected in series;
        said third relay operated upon said second relay operating indicating said solar cells are functioning, and said voltage regulator operating its associated contacts indicating said batteries require further charging to operate said third relay; and
        said third relay operated to close said associated contacts to connect said second plurality of solar cells across said battery.

2. A multi-solar module direct current battery charging arrangement as claimed in claim 1 further including a set of break contacts on said third relay whereby said second plurality of solar cells are connected to nonessential loads during intervals when said voltage regulator contacts are open circuited.

3. A multi-solar module direct current battery charging arrangement as claimed in claim 1 further including a third plurality of solar cells and a fourth relay connected together in series and then in parallel with said second plurality of solar cells and said third relay;
    said fourth relay including a set of make contacts operated upon operation of said relay to connect said third plurality of solar cells across said battery simultaneously with the operation of said third relay.

4. A multi-solar module direct current battery charging arrangement as claimed in claim 3 further including a set of break contacts on said fourth relay whereby said third plurality of solar cells are connected to nonessential loads during intervals when said voltage regulator contacts are open circuited.

5. A multi-solar module direct current battery charging arrangement as claimed in claim 1 wherein said voltage regulator comprises a comparator connected across said battery and operated upon detecting a difference of said batteries voltage as compared with a voltage reference to operate means to close said associated contacts.

6. A multi-solar module direct current battery charging arrangement as claimed in claim 5 wherein said means comprise a relay.

7. A multi-solar module direct current battery charging arrangement as claimed in claim 6 wherein said voltage reference comprises a resistive voltage divider connected across said batteries and includes a zener diode for stability.

* * * * *